US009535688B2

(12) United States Patent
Dani et al.

(10) Patent No.: US 9,535,688 B2
(45) Date of Patent: Jan. 3, 2017

(54) EFFICIENT DEPLOYMENT OF APPLICATION REVISIONS AND IMPLEMENTATION OF APPLICATION ROLLBACKS ACROSS MULTIPLE APPLICATION SERVERS

(71) Applicant: VERIZON PATENT AND LICENSING INC., Arlington, VA (US)

(72) Inventors: Janak U. Dani, Somerset, NJ (US); Krishna Reddy, Irvine, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/339,262

(22) Filed: Jul. 23, 2014

(65) Prior Publication Data

US 2016/0026452 A1 Jan. 28, 2016

(51) Int. Cl.
*G06F 9/44* (2006.01)
*G06F 9/445* (2006.01)

(52) U.S. Cl.
CPC .. *G06F 8/71* (2013.01); *G06F 8/65* (2013.01)

(58) Field of Classification Search
CPC .................. G06F 8/40–8/54; G06F 8/60–8/68; G06F 8/70–8/77
USPC .................................................. 717/168–178
See application file for complete search history.

(56) References Cited

U.S. PATENT DOCUMENTS

| 6,339,772 B1* | 1/2002 | Klein et al. ................... 707/704 |
| 6,349,310 B1* | 2/2002 | Klein et al. ................... 707/703 |
| 6,397,227 B1* | 5/2002 | Klein et al. |
| 6,453,313 B1* | 9/2002 | Klein et al. |
| 6,523,027 B1* | 2/2003 | Underwood |
| 6,546,552 B1* | 4/2003 | Peleg ............................. 717/170 |
| 6,594,822 B1* | 7/2003 | Schweitz et al. .............. 717/140 |
| 6,609,128 B1* | 8/2003 | Underwood ................... 707/610 |

(Continued)

OTHER PUBLICATIONS

A Model Driven Approach to Upgrade Package-Based Software Systems—Antonio Cicchetti, Davide Di Ruscio, Patrizio Pelliccione, Alfonso Pierantonio—Universit'a degli Studi dell'Aquila, Dipartimento di Informatica, Italy; Stefano Zacchiroli—Universit'e Paris Diderot, PPS, UMR 7126, France—ENASE 2008/2009, CCIS 69, pp. 262-276, 2010.*

(Continued)

*Primary Examiner* — Francisco Aponte

(57) ABSTRACT

The deployment of application revisions and performing of application rollbacks across multiple application servers is streamlined by reducing the number of files that are communicated to the application servers to perform updates and rollbacks. An application service is provided by multiple application servers each executing a plurality of compiled code files associated with the application service. Each application server receives a compiled code file corresponding to an update for one of the plurality of compiled code files associated with the application service. The one compiled code file is replaced with the received compiled code file corresponding to the update. The application servers then provide an updated version of the application service by executing the plurality of compiled code files including the replacement compiled code file corresponding to the update. Application rollback is performed using compiled code files stored in a local repository of each application server.

10 Claims, 7 Drawing Sheets

(56) References Cited

U.S. PATENT DOCUMENTS

| | | | |
|---|---|---|---|
| 6,633,878 B1* | 10/2003 | Underwood | |
| 7,100,195 B1* | 8/2006 | Underwood | 726/2 |
| 7,272,815 B1* | 9/2007 | Eldridge et al. | 717/101 |
| 7,328,213 B2* | 2/2008 | Suzuki et al. | |
| 7,490,268 B2* | 2/2009 | Keromytis | G06F 11/0742 714/38.11 |
| 7,694,291 B2* | 4/2010 | Chen | G06F 8/71 717/162 |
| 7,779,401 B2* | 8/2010 | Scian | G06F 8/65 709/203 |
| 8,055,096 B2* | 11/2011 | Dahms | G06F 8/68 382/282 |
| 8,156,487 B2* | 4/2012 | Blumfield | G06F 8/65 717/172 |
| 8,312,447 B2* | 11/2012 | Callaghan | G06F 8/443 717/140 |
| 8,365,160 B2* | 1/2013 | Scian | G06F 8/65 709/203 |
| 8,418,168 B2* | 4/2013 | Tyhurst | G06F 8/65 717/168 |
| 8,468,515 B2* | 6/2013 | Chen | G06F 8/65 713/1 |
| 8,527,977 B1* | 9/2013 | Cheng | G06F 8/62 717/168 |
| 8,533,704 B2* | 9/2013 | Wookey | G06F 8/68 717/174 |
| 8,555,273 B1* | 10/2013 | Chia et al. | 717/173 |
| 8,578,361 B2* | 11/2013 | Cassapakis et al. | 717/168 |
| 8,607,208 B1* | 12/2013 | Arnold | G06F 8/67 717/129 |
| 8,631,397 B2* | 1/2014 | Brar | G06F 8/68 717/170 |
| 8,683,458 B2* | 3/2014 | Schneider | G06F 8/65 717/171 |
| 8,689,200 B1* | 4/2014 | Tallam | G06F 8/4435 717/140 |
| 8,868,506 B1* | 10/2014 | Bhargava et al. | 707/648 |
| 8,943,492 B2* | 1/2015 | Scian | G06F 8/68 717/171 |
| 9,128,722 B2* | 9/2015 | Betouin | G06F 8/423 |
| 2005/0034109 A1* | 2/2005 | Hamilton et al. | 717/140 |
| 2006/0112152 A1* | 5/2006 | Napier | G06F 8/68 |
| 2007/0300205 A1* | 12/2007 | Scian | G06F 8/65 717/106 |
| 2009/0094236 A1* | 4/2009 | Renkes et al. | 707/6 |
| 2009/0113386 A1* | 4/2009 | Eker et al. | 717/108 |
| 2009/0125128 A1* | 5/2009 | Eldridge et al. | 700/86 |
| 2009/0172338 A1* | 7/2009 | Eker et al. | 711/173 |
| 2010/0318986 A1* | 12/2010 | Burke et al. | 717/176 |
| 2013/0039252 A1* | 2/2013 | Motta et al. | 370/312 |
| 2014/0282475 A1* | 9/2014 | Bagal | G06F 8/65 717/171 |
| 2015/0113518 A1* | 4/2015 | Liem et al. | 717/171 |

OTHER PUBLICATIONS

Lock-Free Decentralized Storage for Transactional Upgrade Rollback—Boris Mej'ias, Gustavo Guti'errez, Peter Van Roy—Universit'e catholique de Louvain; John Thomson, Paulo Trezentos—Caixa Magica Software—2010 Workshops on Enabling Technologies: Infrastructure for Collaborative Enterprises—2010 IEEE Computer Society.*

* cited by examiner

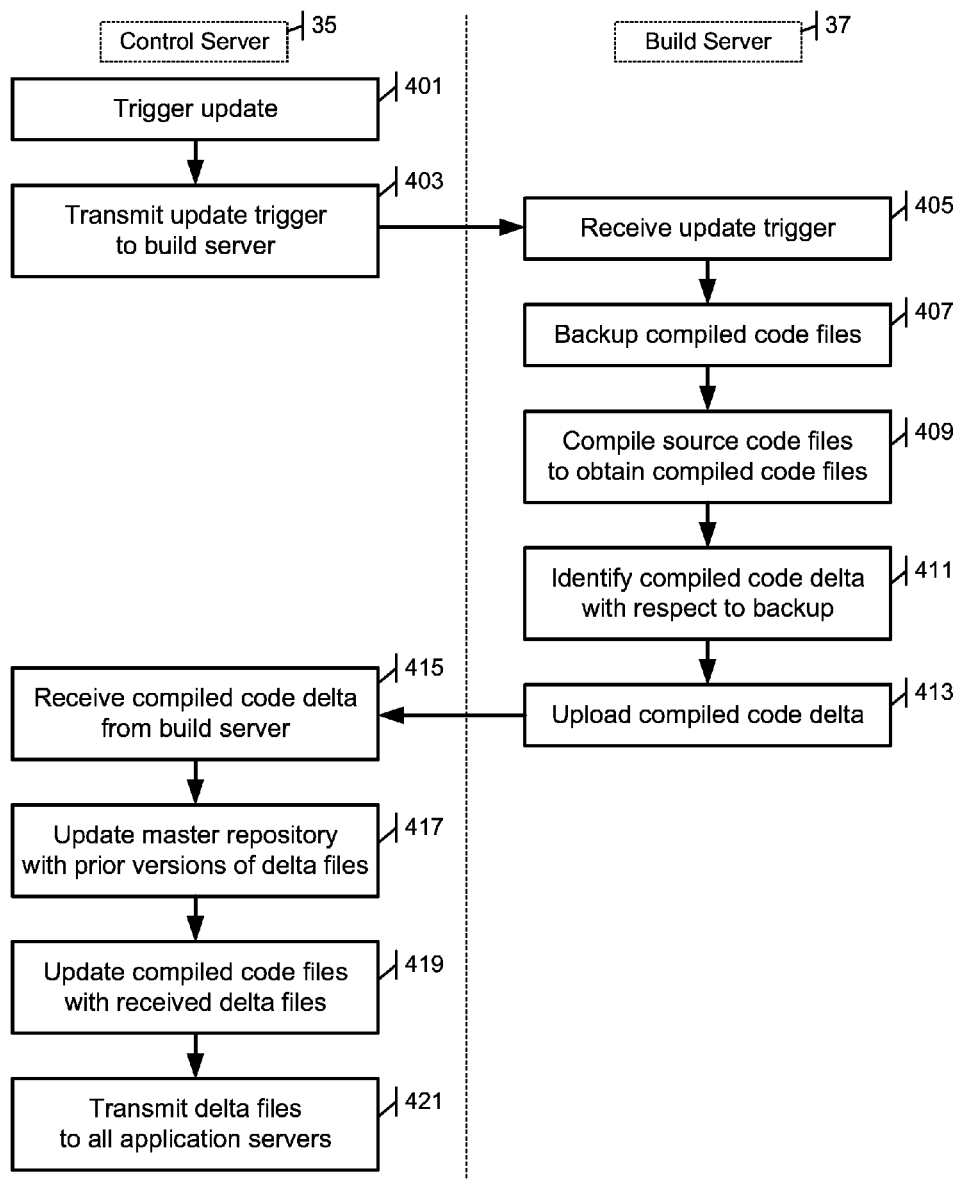

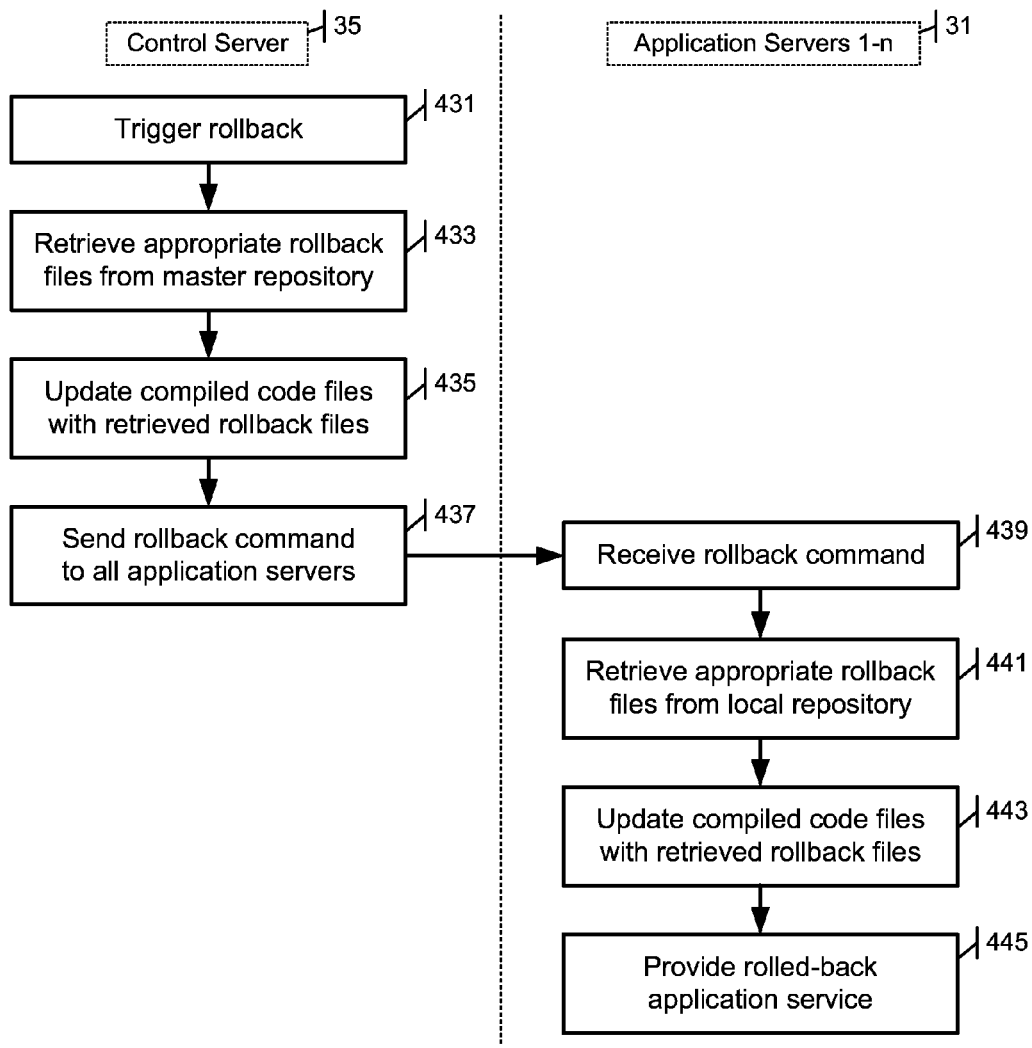

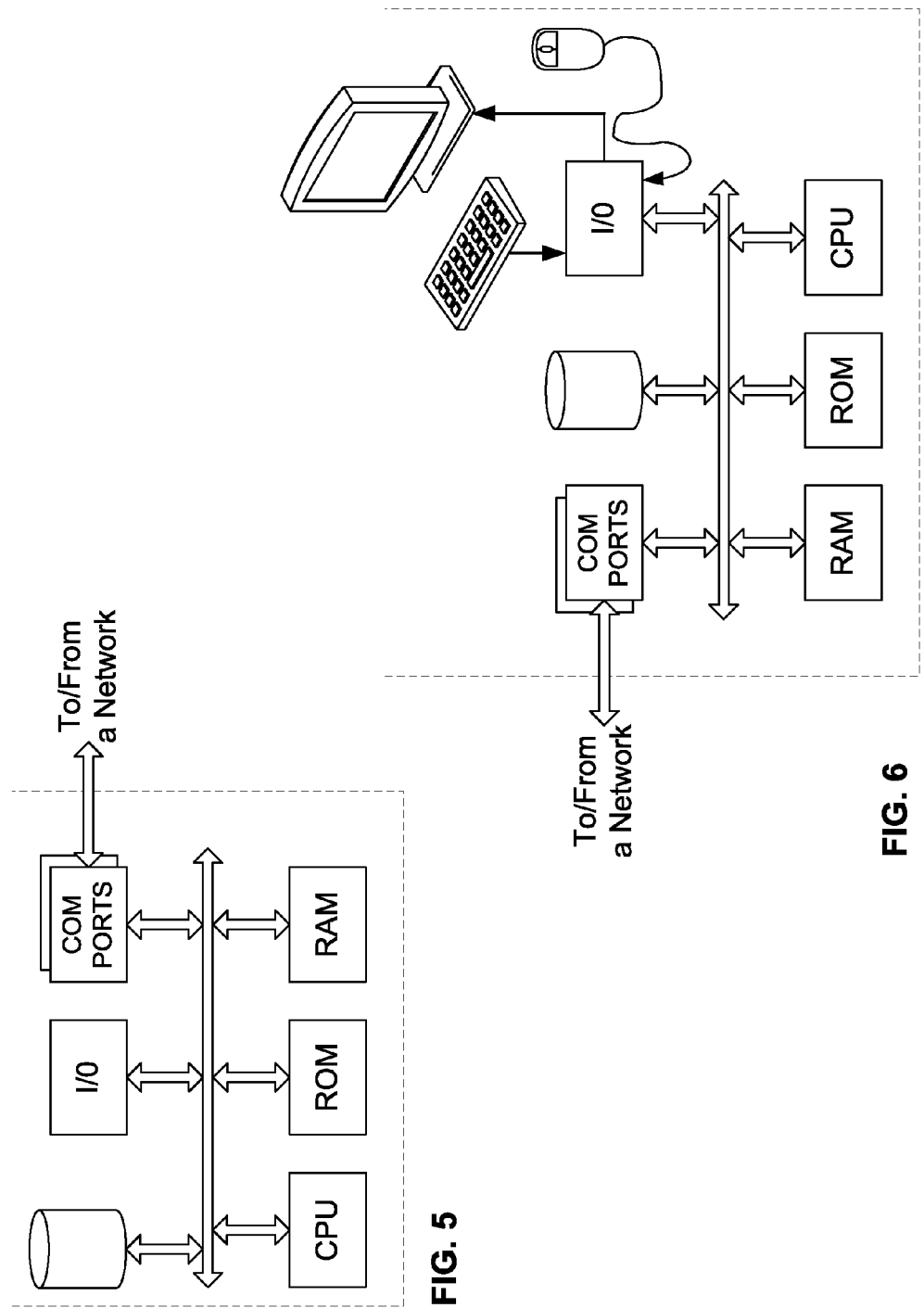

EFFICIENT DEPLOYMENT OF APPLICATION REVISIONS AND IMPLEMENTATION OF APPLICATION ROLLBACKS ACROSS MULTIPLE APPLICATION SERVERS

BACKGROUND

Web-based application services are provided to users via application servers. The application servers execute compiled code files, such as enterprise archive (EAR) and web application archive (WAR) files, to provide the application services. A single application server typically relies on and executes multiple EAR/WAR files as part of providing a single application service. Additionally, a single application service may be provided by multiple separate application servers. The use of multiple application servers may provide additional computing power to enable the application service to be provided more quickly and/or to larger numbers of concurrent users. The use of multiple application servers may further provide high availability to the application service since the application service can continue to be provided seamlessly even if one application server crashes or otherwise becomes unavailable.

Web-based applications are updated on a regular basis in order to add new features to the applications, and to correct coding or functional errors. Each update includes revisions or additions to one or more source code files storing source code for the application. In order to deploy an update, the source code files generally need to be compiled to produce the multiple new EAR/WAR files required to provide the application service, and the multiple EAR/WAR files then need to be sent to all of the application servers providing the application service. Alternatively, the source code files can be sent to all application servers providing the application service, and compiled on each application server to produce the EAR/WAR files locally. In both instances, the update requires a large amount of communication bandwidth in order to transmit the updated code files to each of the application servers. For example, this process can involve transmitting 200-300 MB of code files to 10 different application servers, resulting in 2-3 GB of data being communicated across a network. Each update may therefore use significant network bandwidth and thereby negatively impact other services provided across the network. Additionally, the deployment of the update may be delayed because of the time required to transmit such large amounts of data across the network. Moreover, in situations in which the source code is compiled on each application server, the computing power used to perform the multiple compilations is significant.

Further, after updating a web-based application, the web-based application sometimes needs to be rolled-back to a previous/earlier version of the application, for example in a situation in which an update is not functioning properly or is interfering with other functions of the application. In such a situation, performing the roll-back can necessitate re-compiling of the source code of a previous/earlier version of the application, and transmitting the compiled code of the previous/earlier version of the application to each of the application servers. The roll-back may thus require significant computing power, communication resources, and time to be completed across multiple application servers.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 4A-4C are flow diagrams detailing the processing occurring in the control server, the build server, and each of the application servers during application updating and rollback.

FIG. 5 is a simplified functional block diagram of a computer that may be configured as a host or server, for example, to function as a control, build, or application server in the system of FIG. 1.

FIG. 6 is a simplified functional block diagram of a personal computer or user device.

DETAILED DESCRIPTION

Figure 1:
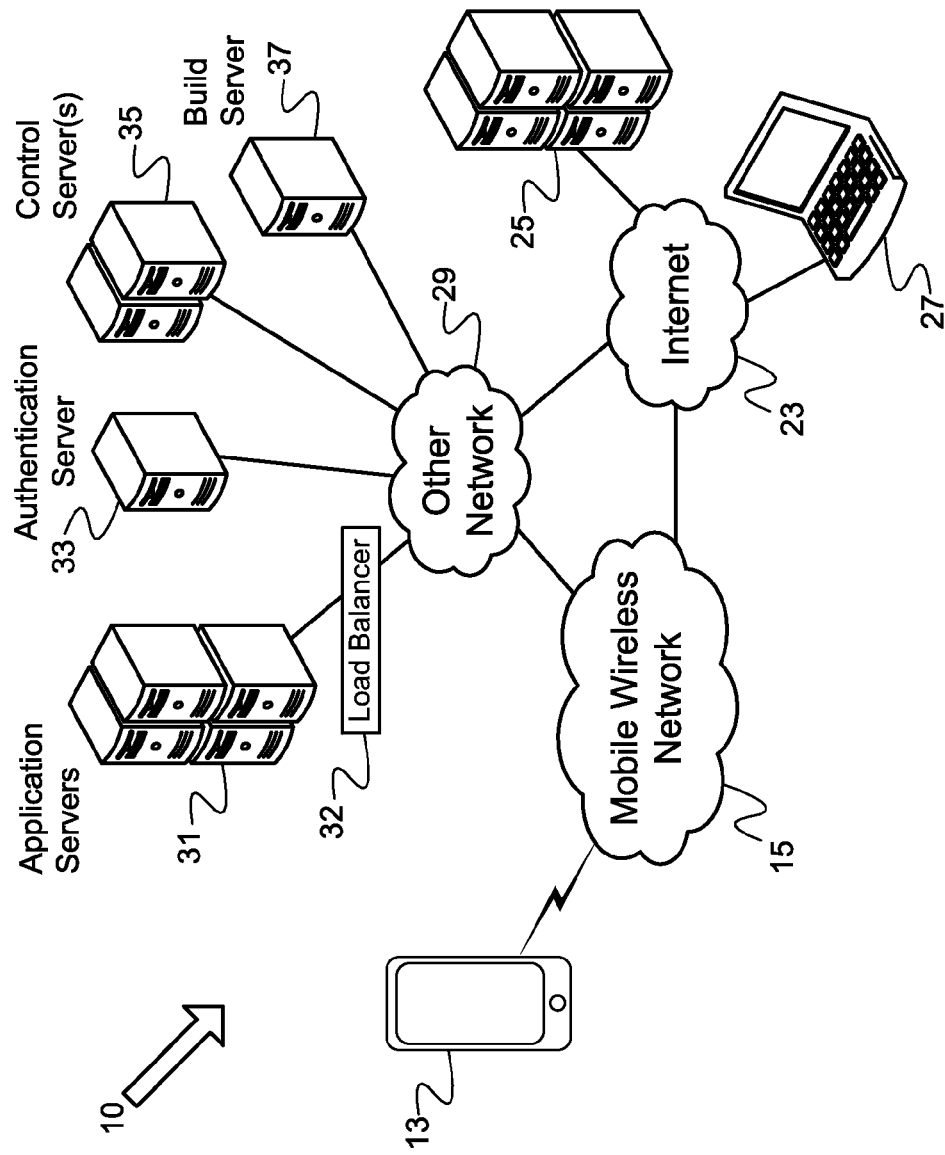
FIG. 1 is a high-level functional block diagram of a system of networks, servers, and user devices that provide various application services and support the efficient updating and rollback of application programs provided by multiple application servers.

In the following detailed description, numerous specific details are set forth by way of examples in order to provide a thorough understanding of the relevant teachings. In other instances, well known methods, procedures, components, and/or circuitry have been described at a relatively high-level, without detail, in order to avoid unnecessarily obscuring aspects of the present teachings.

The various systems and methods disclosed herein relate to enabling the efficient deployment of application revisions and implementation of application rollbacks across multiple application servers.

The deployment of application revisions and the performing of rollbacks across multiple application servers is streamlined by minimizing the amount of information that is communicated to the application servers to perform updates and rollbacks. For this purpose, a build server stores the source code files for the application program providing the application service, and compiles the source code when updates to the source code are to be deployed to the application servers. The build server also stores a previous version of the compiled code for the application and executes a delta engine to identify changes between the previous version of the compiled code and a newly compiled version of the compiled code. The changes form the compiled code delta and are uploaded to a control server for deployment to the application servers.

The control server stores the compiled code (e.g., EAR/WAR files) for a web-application associated with an application service. The control server also maintains a master repository storing information on prior versions of the compiled code. In response to receiving compiled code delta, the control server updates the compiled code it stores based on the compiled code delta to correspond to the new version of the code compiled in the build server. The control server also updates the master repository in order to archive previous versions of files included in the compiled code delta. Finally, the control server transmits the compiled code delta to all of the application servers providing the application service, so as to enable each application server to provide the updated service.

Each application server stores the compiled code files required to provide the application service. Each application server also maintains a local repository storing the information on prior versions of the compiled code. In response to receiving compiled code delta from the control server, each application server updates the local repository in order to archive previous versions of files included in the compiled code delta. The application server also updates the compiled code it stores for execution based on the compiled code delta, such that the compiled code it stores and executes includes the same files as the new version of the code compiled in the build server. In some examples, the application server can reboot itself so as to begin providing the updated application service to users.

When a rollback needs to be performed (e.g., following a defective application update), the control server sends a rollback command to all application servers. The control server and each of the application servers then retrieve from their respective repositories those versions of the compiled code files that need to be rolled back, and update the compiled code files with the appropriate rollback files. The application servers may further reboot themselves so as to begin providing the rolled-back version of the application service to users.

Reference now is made in detail to the examples illustrated in the accompanying drawings and discussed below.

FIG. 1 illustrates a system 10 offering a variety of communication services, including communications for providing application services to user devices such as mobile stations and networked-connected computers. The example shows a mobile station 13 communicating via a mobile wireless network 15 and a personal computer 27 communicating through a wired or wireless (e.g., WiFi) connection via the Internet 23. The mobile station 13 and personal computer 27 are examples of user devices that access application services provided by one or more application servers 31. Other user devices, such as smartphones, tablet computers, or the like, may also be used. The networks 15, 23 provide communication services to users of the application services, as well as to users that do not participate in the application services. The present techniques may be implemented in any of a variety of available networks 15, 23, and/or on any type of device compatible with such networks, and the drawing shows only a very simplified example of a few relevant elements of the networks 15, 23 for purposes of illustration.

In the example of FIG. 1, the application servers 31 are communicatively connected to the networks 15, 23 via the private IP type packet data network 29. The application servers 31 and private network 29 can, in some situations, be operated by a carrier that operates the mobile wireless network 15 and provides services only to the carrier's subscribers. More generally, however, the application servers 31 can be connected directly (or via network 29) to one or both of the networks 15 and 23 for communication with any user device 13, 27 connected to either network.

In order to support a large number of concurrent user requests and/or to provide high availability, an application service can be provided by multiple application servers 31. In such situations, a load balancer 32 may be used to distribute requests for the application service received from user devices 13, 27 across the multitude of application servers 31 providing the application service. The load balancer 32 may distribute the requests across the application servers 31 according to a round-robin distribution scheme, based on the current or estimated load of each application server 31, based on which application servers 31 are currently operating and available, or according to another appropriate distribution scheme. A single application server 31 can provide multiple different application services each corresponding to a different application program executing on the application server 31.

To insure that the application service offered by application server 31 is available to only authorized devices/users, the provider of the application service also deploys an authentication server 33. The authentication server 33 could be a separate physical server (as shown), or authentication server 33 could be implemented as another program module running on the same hardware platform as the application server 31. Essentially, when the application server 31 receives a service request from a client application on a user device, the application server 31 provides appropriate information to the authentication server 33 to allow the authentication server 33 to authenticate the user or user device. Upon successful authentication, the authentication server 33 informs the application server 31, which in turn provides access to the service via data communication through the various communication elements (e.g. 29, 15 and 17) of the system 10. A similar authentication function may be provided for application service(s) offered via the application server 25, either by the authentication server 33 if there is an appropriate arrangement between the carrier and the operator of server 25, by a program on the server 25, or via a separate authentication server (not shown) connected to the Internet 23.

The operator of an application service provided via multiple application servers 31 may manage the application service via a control server 35 and a build server 37 that are communicatively connected to the application servers 31 via the private network 29 and/or to the Internet 23. In general, a single control server 35 is used. However, to ensure high availability of the services provided by the control server 35, two or more control servers 35 can be used in some examples. In situations in which multiple control servers 35 are used, one control server 35 functions as the primary (master) control server and a background synchronization process is used to maintain an exact replica of the information stored on the primary control server in one or more secondary (slave) control servers to enable any secondary control server to seamlessly take over functioning as the primary server if the primary control server becomes unavailable or is too busy to handle new/additional requests.

The control server 35 is used to manage the application program installed on each of the application servers 31 for providing the application service, and is notably used to deploy software updates to the application program across all of the application servers 31. For this purpose, the control server 35 can trigger the build server 37 to compile an updated version of the application program, receive the updated compiled program code from the build server 37, and distribute the updated program code to each of the application servers 31. Further details of these processes will be described in more detail in relation to FIGS. 2, 3, and 4A-4C.

Figure 2:
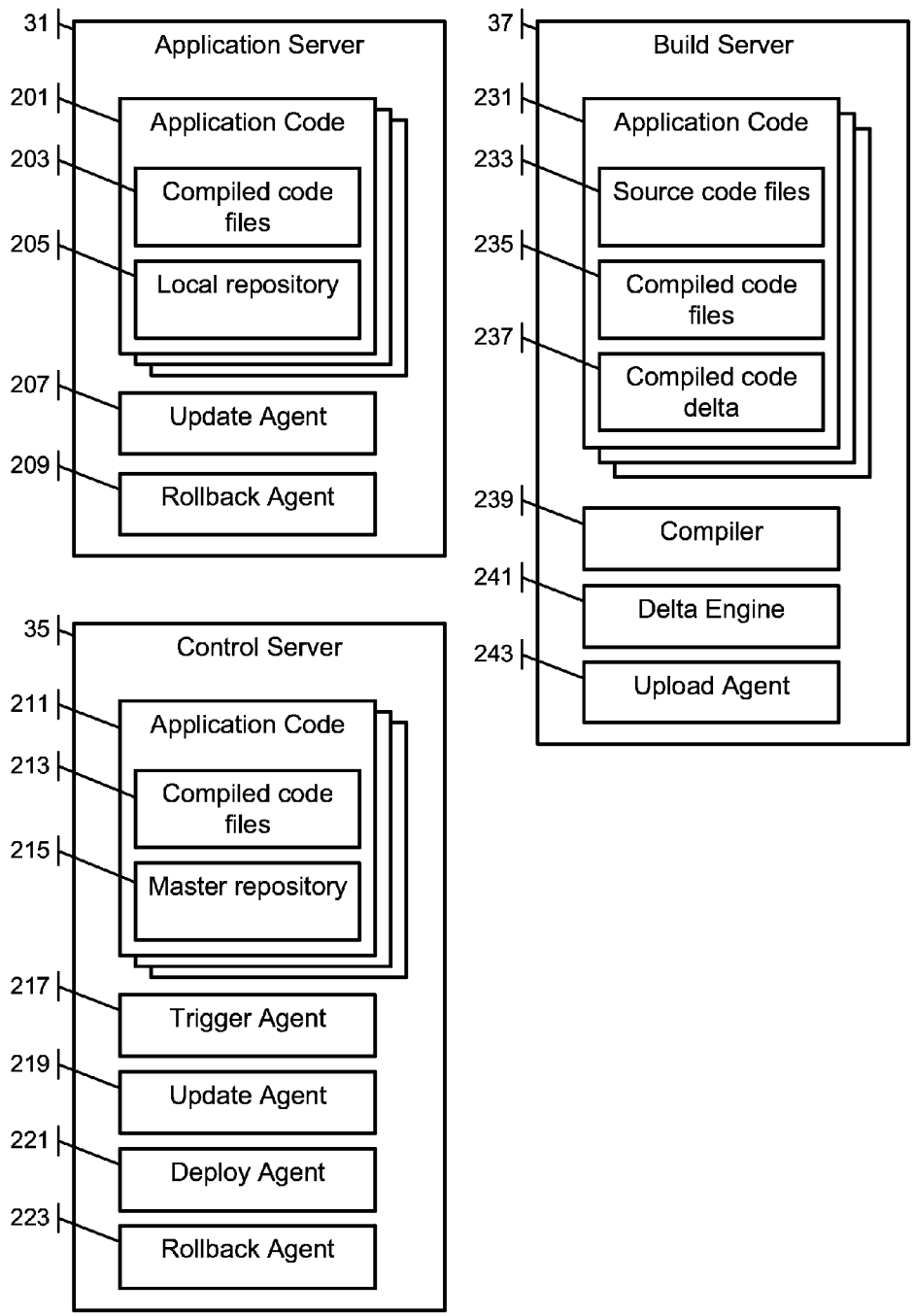
FIG. 2 is a series of schematic block diagrams showing functional elements of an application server, a control server, and a build server that may support the efficient updating and rollback of application programs.

FIG. 2 is a series of schematic block diagrams showing functional elements of an application server 31, a control server 35, and a build server 37.

The build server 37 stores application code 231 for each of a plurality of application programs. Each of the application programs, when executed by an appropriate application server (e.g., at 31), provides a corresponding application service to user devices (e.g., 13, 27) requesting the application service. For each different application program, the build server 37 stores application code 231 including source code files 233 that are needed to compile the application program, such as java source code files. In general, the application code 231 stored in the build server 37 is not executed by the build server 37. Instead, the files stored as application code 231 are treated as data that each of the compiler 239, the delta engine 241, and the upload agent 243 operate on when the compiler 239, the delta engine 241, and the upload agent 243 are executed by the build server 37.

The build server 37 can thus execute a compiler 239 that is configured to retrieve from memory and compile the source code files 233 in order to produce and store in memory the compiled code files 235 corresponding to the application program. The compiled code files 235 can be EAR/WAR files, for example, and generally include all of the files that are necessary to execute the application program on an application server 31. As such, the compiled code files can include EAR/WAR files as well as text files and various static contents files (e.g., hypertext markup language (HTML) files, cascading style sheet (CSS) files, JavaScript (JS) files, and the like) that can be deployed with the EAR/WAR files and used by the application servers as part of providing the application service provided by the deployed application program.

Prior to compiling the source code files 233, the build server 37 stores a backup copy of the compiled code files corresponding to a previous/earlier version of the source code, and can optionally erase the compiled code files 235. The compiler 239 then produces a new set of compiled code files 235 that correspond to the new/updated version of the application program. Following the compilation, the delta engine 241 can be triggered to begin execution on the build server 37. In response to executing the delta engine 241 on the build server, the delta engine 241 compares the backup copy of the compiled code files with the new compiled code files 235 produced by the compiler 239, and identifies as the compiled code delta 237 those compiled code files that have been changed between the previous/earlier version of the compiled code (stored as the backup copy) and the current/new/updated version (stored as the compiled code files 235 following the compilation). The delta engine 241 stores the compiled code delta 237 in memory as part of the application code 231. In turn, the upload agent 243 is executed on the build server 37. Execution of the upload agent 243 causes the upload agent to upload the compiled code delta files 237 to the control server 35 via a communication link (e.g., a direct communication link, a network communication link such as a link through network 29, or the like).

The control server 35 also stores application code 211 for each of a plurality of application programs. The application code 211 stored in the control server 35, however, generally does not include source code files. Instead, the application code 211 includes compiled code files 213 for the application that are maintained to be a replica of the compiled code files 235 stored in the build server 37. Specifically, the compiled code files 213 are maintained based on the received compiled code delta files 237. As in the case of the application code 231 stored in the build server, the application code 211 stored in the control server 35 is generally not executed in the control server 35 and is instead treated as data that each of the update agent 219, deploy agent 221, and rollback agent 223 operate on when the update agent 219, deploy agent 221, and rollback agent 223 are executed by the control server 35.

In general, in response to receiving the compiled code delta files 237 from the build server 37 across the network 29, the update agent 219 executed on the control server 35 determines which of the compiled code files 213 stored in the control server 35 are to be updated with corresponding updated files included in the compiled code delta files 237 received from the build server 37. The update agent 219 then copies or moves the determined files to the master repository 215, and identifies the copied or moved files in the repository 215 with identifiers for the current application update. In this way, the master repository 215 need not store a full set of the compiled code files 213, but may instead only store those compiled code files that are being overwritten or removed as part of an application update. The master repository 215 may therefore generally not store all of the files required to execute the current or earlier versions of the application, although the master repository 215 and the compiled code files 213 jointly store all files required to execute the current version and earlier versions of the application.

In some examples, however, in response to receiving the compiled code delta files 237, the update agent 219 copies all compiled code deltas 237 to the master repository 215. In such examples, the master repository 215 stores all of the files required to execute the current and any earlier versions of the application. The update agent 219 may rename the compiled code delta files 237 stored in the repository 215 and/or include in the repository 215 identifiers for each file indicating the application version or update that the file is associated with.

Finally, the update agent 219 incorporates the compiled code delta files 237 into the compiled code files 213 by overwriting in memory any files that are determined to be updated. At this stage, by copying the compiled code delta files 237 into the compiled code files 213 in the memory of the control server 35, the compiled code files 213 of the control server 35 store the same files as the compiled code files 235 of the build server 37.

The deploy agent 221 may be triggered for execution on the control server 35 in response to the update agent 219 completing the processing of the compiled code files 213 in the control server 35. The deploy agent 221 causes the received compiled code delta files 237 to be transmitted via network 29 to each of the application servers 31 that execute the application program for providing the application service.

Each application server 31 stores the application code 201 for each of a plurality of application programs that the application server 31 executes. Each application code 201 includes compiled code files 203 that correspond to the current version of the application being executed by the application server 31. The compiled code files 203 include all the files required to execute the application program. Execution of the compiled code files 203 for an application by the application server 31 causes the application server 31 to provide the application service associated with the application. The application code 201 also includes a local repository 205 that stores information on previous versions of the compiled code files that were previously installed on (and executed by) the application server 31. In response to receiving the compiled code delta files 237 from the control server 35 via network 29, the update agent 207 executing on the application server 31 performs processing similar to that performed by update agent 219 in order to perform a backup, in the local repository 205 stored by the application server 31, of the compiled code files 203 that are to be updated with corresponding updated compiled code files included in the compiled code delta files 237. The update agent 207 then copies the compiled code delta files 237 into the compiled code files 203, and causes the application server 31 to re-start in order to begin providing the updated application service according to the updated compiled code files. The application server 31 can then provide the updated application service by executing the compiled code files 203 that include the new/updated versions compiled code files included among the compiled code delta files 237.

The control server 35 includes a trigger agent 217 that is operative to trigger an application update, and to cause the control server 35 to trigger the build server 37 to initiate the compilation of an application update as detailed above. The trigger agent 217 is also operative to trigger an application rollback. In response to an application rollback trigger, the rollback agent 223 of the control server 35 identifies a previous/earlier version of the compiled code to which the rollback should be performed. The rollback agent retrieves from the master repository 215 the prior/earlier versions of each of the compiled code files that have been updated since the identified rollback version, and copies the retrieved files into the compiled code file repository 213 in order to revert the compiled code files 213 to the files corresponding to the previous/earlier version of the compiled code. The rollback agent 209 of each application server 31, upon receiving a rollback command from the rollback agent 223 of the control server 35, performs functions substantially similar to those of the rollback agent 223 in order to restore the compiled code files 203 to a previous version of those files based on previous version of the compiled code that are archived in the local repository 205 of each server 31. The rollback agent 209 can also cause the application server 31 to re-start in order to begin providing the rolled back application service according to the rolled back compiled code files 203.

Figure 3:
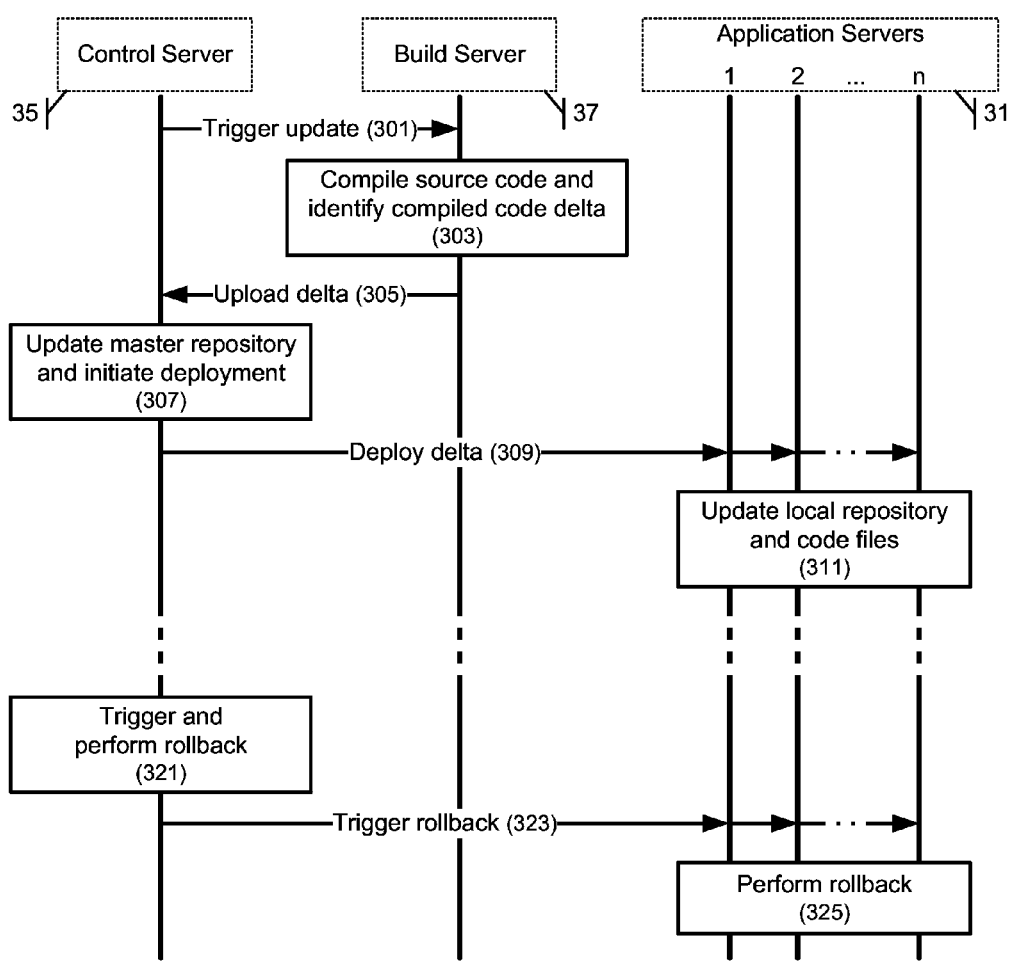
FIG. 3 is a communication flow diagram showing the sequential flow of communications between the control server, the build server, and multiple application servers during application updating and rollback.

FIG. 3 is a communication flow diagram 300 showing the sequential flow of communications between the control server 35, the build server 37, and n different application servers (1, 2, . . . n) 31 during application updating and rollback.

The application update process begins with the control server 35 sending a trigger update command to the build server 37 in step 301. The trigger update command can include identification of the particular application that should be updated. In response to receiving the trigger update command, the build server 37 in step 303 compiles the source code files 233 corresponding to the identified application to generate the compiled code files 235, and determines the compiled code delta 237 between the new/updated version of the compiled code files 235 and an earlier version of the compiled code files. In some examples, the source code has previously been compiled prior to receiving the trigger update of step 301; in such examples, step 303 only includes determining the compiled code delta 237 between the new/updated version of the compiled code files 235 and an earlier version of the compiled code files. The earlier version of the compiled code files can correspond to the last version (if any) of the compiled code file that was previously deployed using the method 300. The build server 37 then uploads the compiled code delta 237 to the control server 35 in step 305. In response to receiving the compiled code delta 237, the control server 35 updates the master repository 215 and the compiled code files 213 in step 307, and initiates deployment of the updated application information to the application servers 31. Specifically, the control server 35 transmits the compiled code delta 237 to each of the application servers (1, . . . , n) that provide the application service in step 309. Each application server 31 updates the local repository 205 and the compiled code files 203 in step 311, based on the received compiled code delta 237. The application servers 31 may re-start, if needed, in order to begin providing the new/updated version of the application service based on the updated compiled code files 203.

The application rollback process begins with the control server 35 receiving a rollback trigger and performing a rollback back in step 321. The rollback trigger identifies the application that should be rolled back, as well as the previous version of the application code to which the rollback should be performed. The rollback may include retrieving from the master repository 215 previous versions of the compiled code files 213 that have been updated in application updates that are more recent than the application version corresponding to the rollback, and overwriting the updated files among the compiled code files 213 with the files retrieved from the master repository 215. The rollback also includes transmitting a rollback trigger command in step 323 to each of the application servers (1, . . . , n) that provide the application service. The rollback trigger command identifies the previous version of the application code to which the rollback should be performed. In general, the previous version of the application code to which the rollback should be performed is identified with reference to the currently deployed version of the application, such that an identifier "rb1" indicates that the rollback should be performed to the immediately preceding version of the application, "rb2" indicates that the rollback should be performed to the second-to-last version of the application, etc. In other examples, the version of the application to which the rollback should be performed is identified according to the version number of the application, such that an identifier "rb3.4" would rollback the application to version 3.4 regardless of the currently installed version of the application. Each application server 31 then performs a rollback to the identified previous version of the application code based on the data stored in the local repository 205 in step 325. The application servers 31 may re-start, if needed, in order to begin providing the rolled back version of the application service based on the rolled back compiled code files 203.

Figure 4B:
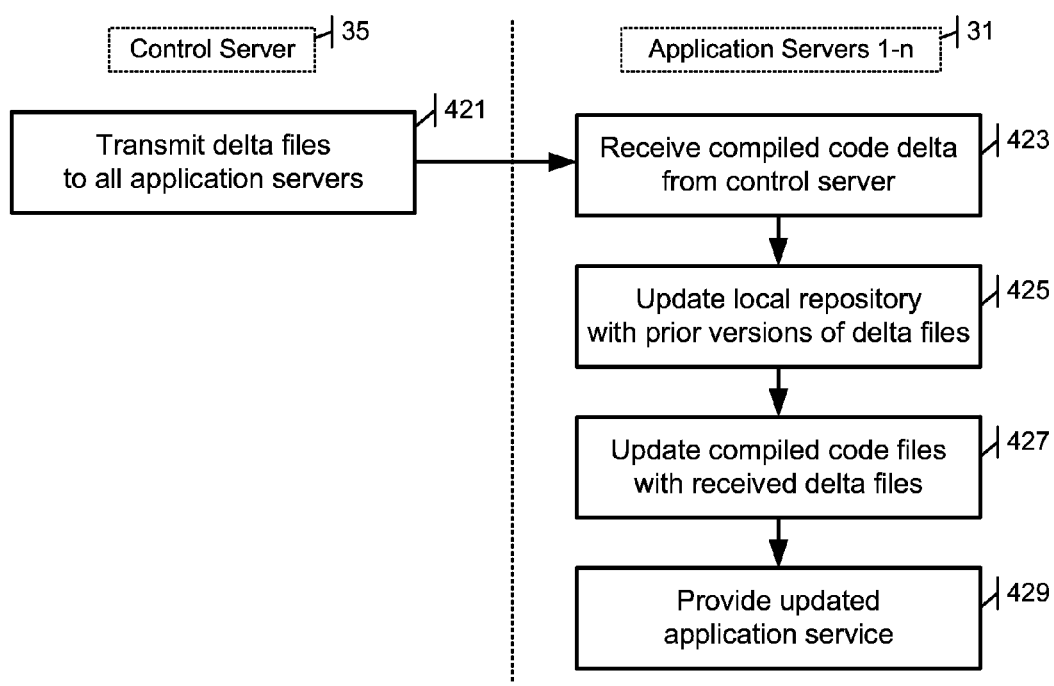

FIGS. 4A-4C are flow diagrams detailing the processing occurring in the control server 35, the build server 37, and each of the application servers 31 during application updates and rollbacks.

The application update processing begins in the control server 35 with the detection of a trigger to begin an application update in step 401. The application update can be triggered manually by a system administrator, programmer, or other individual or system. The application update can alternatively be triggered automatically, for example on a periodic or pre-scheduled basis, in response to detecting a change in source code, or the like. In response to the trigger, the trigger agent 217 of the control server 35 generates and transmits an update trigger to the build server 37 in step 403. The update trigger can be transmitted via network 29, and/or via networks 15 and/or 23, to the build server 37. The update trigger includes identification of the application to be updated. Step 403 may correspond to step 301 of FIG. 3.

The build server 37 receives the update trigger in step 405. In response to receiving the update trigger, the build server 37 can optionally determine whether an update is necessary. For example, the build server 37 can search among the source code files 233 for the most recently modified source code file, can search among the compiled code files 235 for the most recently modified and deployed compiled code file, and can determine whether any source code file 233 has been modified since the last compilation and deployment (as determined by a timestamp of the most recently modified compiled code file). If the source code has not been modified since the last compilation and deployment, the build server 37 can send a notification back to the control server 35 indicating that the most recent application version has already been deployed. If the source has been modified since the last compilation and deployment, the build server 37 proceeds to step 407.

In step 407, the build server 37 performs a backup of the compiled code files 233. The backup may include creating a copy of the current compiled code files stored in the application code 231, and which correspond to the compiled code files for a previous/earlier version of the application that was deployed to the application servers. The backup copy of the compiled code files 235 may be stored in a temporary storage location. Once the backup is complete, the compiled code files 235 can optionally be erased. The compiler 239 of the build server 37 then compiles the source code files 233 in step 409 to obtain the compiled code files 235 corresponding to the new/updated application. As part of the compilation, the previous version of the compiled code files 235 may be overwritten with the new/updated compiled code files if the previous compiled code files were not deleted prior to the compilation. While steps 407 and 409 are shown in FIG. 4A as being performed following the receipt of the update trigger (in step 405), in some examples the source code can be backed up and compiled prior to receipt of the update trigger. In such examples, processing can proceed directly from step 405 to step 411 since the new/updated compiled code files and the backup copy of the previous/earlier compiled code files are already stored by the server.

In step 411, the delta engine 241 of the build server 37 compares the new/updated compiled code files 235 with the backup copy storing the previous/earlier compiled code files in order to identify the changes in the compiled code files between the previous/earlier version and the new/updated version. In some situations, the delta engine 241 has to expand an archive file (e.g., a zip file) that stores the EAR/WAR files of newly compiled code. In general, the comparison is performed on a file-by-file basis in order to determine whether each file has remained the same or has changed. The comparison is performed to identify three types of changes: (1) any new/updated compiled code file that is different from a similarly named previous/earlier compiled code file (i.e., compiled code files that have been changed), (2) any new/updated compiled code files that do not have similarly named previous/earlier compiled code files (i.e., new compiled code files), and (3) any previous/earlier compiled code files that do not have similarly named new/updated compiled code files (i.e., eliminated compiled code files). In some examples, the comparison can be performed folder-by-folder (to identify any folders in the compiled code files 235 that include any new/changed/eliminated files, and that are new/changed/eliminated folders), or the like. Based on the comparison results, the delta engine 241 creates and stores the compiled code delta 237 which stores the compiled code files that have been changed and the new compiled code files, and identifies the eliminated compiled code files. In general, as a result of compiling an application update, the compiled code delta 237 includes only a subset of the compiled code files 235 (i.e., the compiled code delta 237 includes some but not all of the compiled code files 235) as at least some compiled code files 235 are left unchanged during an application update. Once the compiled code delta 237 has been identified, the upload agent 243 of the build server 37 uploads the compiled code delta 237 to the control server 35 in step 413. Step 413 may correspond to step 305 of FIG. 3.

The control server 35 receives the compiled code delta 237 from the build server 37 in step 415. In response to receiving the compiled code delta 237, the update agent 219 of the control server 35 is activated. In step 417, the update agent 219 begins by updating the master repository 215 to ensure that the master repository stores sufficient information to enable a full recovery of the current compiled code files 213 (corresponding to a previous/earlier version of the application) after the compiled code files 213 are updated based on the compiled code delta 237. The updating of the master repository 215 may thus include two steps: (1) identifying the changed compiled code files included in the compiled code delta 237, and copying or moving to the master repository 215 the previous/earlier version of these compiled code files (i.e., the version of the files that is currently stored in the compiled code files 213); and (2) identifying the eliminated compiled code files identified in the compiled code delta 237, and moving to the master repository 215 the previous/earlier versions of these compiled code files. Note that the updating of the master repository 215 can also include renaming of the files to ensure that the moving or copying of the files to the master repository 215 does not involve overwriting other earlier versions of the files that were previously stored in the master repository 215 (and corresponding to other versions of the application). The updating of the master repository 215 also includes updating a master repository log that associates with each application update the files associated with the application update that are stored in the master repository 215 (including the original filename of each file, the original location (e.g., folder) of each file within the compiled code files 213, and the name of the corresponding file in the master repository 215). In general, the updating of the master repository includes copying (or moving) only a subset (i.e., some but not all) of the compiled code files 213 into the master repository 215, since the master repository does not need to store copies of those compiled code files 213 that remain unchanged by the application update.

In step 419, the update agent 219 updates the compiled code files 213 stored in the control server 35 based on the compiled code delta 237. Specifically, the update agent 210 performs three steps: (1) overwriting of or replacing any previous/earlier compiled code files 213 that correspond to a new/updated compiled code file included in the compiled code delta 237 with the new version of the compiled code file included in the compiled code delta 237, (2) copying of any new compiled code file included in the compiled code delta 237 into the compiled code files 213, and (3) removing or deleting of any previous/earlier compiled code files 213 that are identified in the compiled code delta 237 as corresponding to eliminated compiled code files. Following the update of the compiled code files 213 in step 419, the compiled code files 213 stored in the control server 35 should store the same information (i.e., same files) as the compiled code files 235 stored in the build server 37, while only a subset of those files has been transmitted between the build server 37 and the control server 35 as part of the compiled code delta 237. Hence, the control server 35 stores all of the compiled code files necessary to provide the updated application service without having had to receive all of the files as part of the application update.

In step 421, the deploy agent 221 of the control server 35 transmits the compiled code delta 237 to each of the application servers 31 executing the application program and providing the application service that is being updated. Step 421 may correspond to step 309 of FIG. 3. Step 421 concludes the processing steps shown in FIG. 4A, but corresponds to the beginning of the processing steps shown in FIG. 4B. As shown in FIG. 4B, the compiled code delta 237 is transmitted to each of the n application servers (1, . . . , n, where n is a positive integer greater than 1). Each of the application servers 31 then independently performs steps 423-429 detailed in FIG. 4B.

Each application server 31 receives the compiled code delta 237 from the control server 35 in step 423. In response to receiving the compiled code delta 237, the update agent 207 on the application server 31 begins operation. In steps 425 and 427, the update agent 207 performs steps substantially similar to steps 417 and 419 performed on the control server 35. Specifically, in step 425, the update agent 207 begins by updating the local repository 205 to ensure that the local repository stores sufficient information to enable a full recovery of the current compiled code files 203 (corresponding to a previous/earlier version of the application) after the compiled code files 203 are updated based on the compiled code delta 237. Reference can be made to the description of step 417 (relating to updating of the master repository 215) for additional detail on the steps involved in updating the local repository 205 and on the files stored in the repository following the update. In step 427, the update agent 207 updates the compiled code files 203 stored in the application server 31 based on the compiled code delta 237. Reference can be made to the description of step 419 (relating to updating of the compiled code files 213) for additional detail on the steps involved in updating the compiled code files 203. Following the update of the compiled code files 203, the compiled code files 203 stored in each application server 31 should store the same information (i.e., same files) as the compiled code files 213 and 235 stored in the control and build servers 35 and 37, respectively, while only a subset of those files has been transmitted to the application server 31 from the control and build servers 35 and 37 as part of the compiled code delta 237.

Once the compiled code files 203 have been updated on the application servers 31, each application server 31 provides the updated application service by executing the updated compiled code files 203 stored therein in step 429. In order to provide the updated application service, the update agent 207 may trigger a restart of the application server 31 to cause the application server 31 to load and execute the updated files.

Steps 401-429 as described above can be automatically performed in sequence in response to an application update trigger such as the triggers described in relation to step 401 above. In some examples, however, steps 403-429 may be performed in response to two separate triggers. A first trigger may cause steps 403-419 to be performed to cause the updated application files to be deployed on to the control server. Steps 421-429 may then only be performed after completion of step 419 and upon receipt of a second trigger causing the updated application files to be deployed on each of the application servers. The two separate triggers can be used to closely control the timing of the deployment of an application update onto application servers since the timing of the deployment onto the application servers can be controlled independently of the time required to perform steps 403-429.

Following the deployment of one or more updates to an application program on the control server 35 and the application servers 31, the application may need to be rolled back to a previous/older version of the application. In such situations, the trigger agent 217 of the control server 35 may detect a trigger to begin an application rollback in step 431. The flow diagram of FIG. 4C shows steps involved in an application rollback. The application rollback can be triggered manually by a system administrator, programmer, or other individual or system. The application rollback can alternatively be triggered automatically, for example upon detecting that large numbers of errors are occurring in the application program or application service following an application update. For example, an application executing on application server(s) 31 may be configured to automatically generate and send an error notification to a central server (e.g., control server 35, or server 25) whenever an error is detected; in turn, the central server monitors the received error notifications and automatically sends a rollback trigger to the trigger agent 217 of the control server 35 when a threshold number of errors or a threshold error rate is exceeded. In response to the rollback trigger, the trigger agent 217 of the control server 35 initiates a rollback by triggering the rollback agent 223 on the control server 35. The rollback trigger identifies a previous version of the application to which the rollback should be performed. The identified version of the application may be the immediately preceding version of the application (i.e., the version which was executed on the servers 31, 35 immediately before the last deployed update), or an earlier version of the application.

In response to the trigger, the rollback agent 223 retrieves the appropriate rollback files from the master repository 215 of the control server 35 in step 433. Specifically, the rollback agent 223 can begin by retrieving the master repository log in order to identify files stored in the master repository 215 and associated with each application update. The rollback agent 223 then identifies the compiled code files 213 that have been changed or updated in application updates since the application version to which the rollback should be performed, and retrieves from the master repository 215 the version of each changed/updated file that corresponds to the identified rollback version. The rollback agent 223 also identifies the compiled code files 213 that have been eliminated in application updates since the application version to which the rollback should be performed, and retrieves from the master repository 215 the version of each eliminated file that corresponds to the identified rollback version. Optionally, the rollback agent 223 can identify the compiled code files 213 that have been added in application updates since the application version to which the rollback should be performed. In examples in which compiled code files were renamed in the master repository, the rollback agent 223 retrieves the original filename (and location) for each file.

In step 435, the rollback agent 223 updates the compiled code files 213 stored in the control server 35 based on the files retrieved in step 433. Specifically, the rollback agent 223 copies into the compiled code files 213 the retrieved version of any file that was changed or updated in application updates since the application version to which the rollback is performed. The copying may overwrite or otherwise replace the more recent version of the corresponding file among the compiled code files 213. The rollback agent 223 further copies into the compiled code files 213 the retrieved version of any file that was eliminated in application updates since the application version to which the rollback is performed. Finally, and optionally, the rollback agent 223 may remove or delete from the compiled code files 213 those files identified as having been added in application updates since the application version to which the rollback is performed. Once step 435 is completed, the compiled code files 213 stored in the control server 35 should store the same information (i.e., the same files) as the compiled code files that were stored in the control server 35 when the rollback version was first installed on the control server 35. The rollback is performed based only on compiled code files that were already stored among the compiled code files 213 and in the master repository 215 of the control server 35, and is thus performed without transmitting any compiled code file to or from the control server 35.

As part of the rollback, the rollback agent 223 of the control server 35 generates and transmits a rollback command to each of the n application servers (1, . . . , n). The rollback command identifies the version of the application to which the rollback is being performed. Each of the application servers 31 then independently performs steps 439-445.

Each application server 31 receives the rollback command from the control server 35 in step 439. In response to receiving the rollback command, the rollback agent 209 on the application server 31 begins operation. In steps 441 and 443, the rollback agent 209 performs steps substantially similar to steps 433 and 435 performed on the control server 35. Specifically, in step 441, the rollback agent 209 begins by retrieving the appropriate rollback files from the local repository 205 of the application server 31. Reference can be made to the description of step 433 (relating to the retrieval of rollback files from the master repository 215) for additional detail on the steps involved in retrieving rollback files from the local repository 205 and on the files retrieved. In step 443, the rollback agent 209 updates the compiled code files 203 stored in the application server 31 based on the files retrieved in step 441. Reference can be made to the description of step 419 (relating to updating of the compiled code files 213) for additional detail on the steps involved in updating the compiled code files 203 and on the files involved in the rollback. Following the update of the compiled code files 203, the compiled code files 203 stored in each application server 31 should store the same information (i.e., same files) as the compiled code files that were stored in the application server 31 and the control server 35 when the rollback version was first installed. The rollback is performed based only on compiled code files that were already stored among the compiled code files 203 and in the local repository 205 of the application server 31, and is thus performed without transmitting any compiled code file to or from the application server 31.

Once the compiled code files 203 have been updated on the application servers 31, each application server 31 provides the rolled-back application service by executing the rolled-back compiled code files 203 stored therein in step 445. In order to provide the rolled-back application service, the rollback agent 209 may trigger a restart of the application server 31 to cause the application server 31 to load and execute the rolled-back files.

As part of performing the rollback in an application server 31 (e.g., steps 441 and 443), the rollback agent 209 may monitor the progress of the rollback process in order to determine whether any errors have occurred. If the rollback agent 209 determines that an error has occurred as part of the retrieving of rollback files (e.g., step 441), the updating of the compiled code files (e.g., step 443), the restart of the application server 31, or any other portion of the rollback, the rollback agent 209 may generate and transmit to the control server 35 an error message identifying the error(s) that have been detected. The rollback agent 209 can optionally attempt to re-initiate the rollback in order to determine whether the rollback can be successfully performed on the second try. In response to receiving an error message from an application server 31, the control server 35 or a system administrator can take appropriate action. For example, the control server 35 may automatically cause the application server 31 from which the error notification was received to stop providing the application service associated with the failed rollback, or a system administrator may attempt to review an error log of the application server 31 from which the error notification was received in view of rectifying a problem having caused the error.

While not shown in FIG. 4C, in some examples the rollback agents 209 and 223 are configured to update the local and master repositories, respectively, prior to retrieving rollback files in steps 433 and 441, respectively. In such examples, the rollback agent 223 thus performs a step substantially similar to step 417 prior to performing step 433, while rollback agent 209 performs a step substantially similar to step 425 prior to performing step 441. The updating of the local and master repositories by the rollback agent ensures that the master repository stores all compiled code files that would be needed to roll forward the application to the most recent update for the application after the rollback has been completed.

The systems and methods disclosed herein and relating to the efficient deployment of application revisions and rollbacks across multiple application servers enable application revisions to be deployed across multiple application servers while transmitting a minimal amount of information (i.e., only the compiled code delta) between servers, thereby reducing network bandwidth usage and accelerating application update processes. In use examples, the update of a large application can be performed in approximately 4 minutes as compared to the 25 minutes required when the entire code files are transmitted between servers. Application rollbacks can be performed without communication any code files between servers, and a rollback can be performed in only 25 seconds (compared to 25 minutes required under previous methods).

As shown by the above discussion, functions relating to enabling the efficient deployment of application revisions and rollbacks across multiple application servers may be implemented on computers connected for data communication via the components of a packet data network, operating as a control server, a build server, and/or an application server as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the deployment of application updates and the control of application rollbacks. The software code is executable by the general-purpose computer that functions as the control, build, and application servers. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for deploying application updates and implement application rollbacks in essentially the manner performed in the implementations discussed and illustrated herein.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of user device, although the computer of FIG. 6 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of efficient deployment of application updates and implementation of application rollbacks outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of a server that will be the control server, the build server, or an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
providing, in an application server communicatively connected to a communication network, a first version of an application service by executing a first plurality of compiled code files associated with the application service and stored by the application server, the first plurality of compiled code files including a first compiled code file and a second compiled code file;
receiving, in the application server, a replacement compiled code file corresponding to a second version of the application service for the first compiled code file;
in response to the receiving of the replacement compiled code file, performing the steps of:
archiving the first compiled code file in a local repository, local to and stored by the application server;
replacing the first compiled code file of the first plurality of compiled code files with the received replacement compiled code file to generate a second plurality of compiled code files including the replacement compiled code file and the second compiled code file;
and
providing, in the application server, the second version of the application service by executing the second plurality of compiled code files;
receiving, in the application server, identification of a third compiled code file included in the first plurality of compiled code files that is not needed to provide the second version of the application service;
in response to receiving the identification of the third compiled code file, performing the steps of:
archiving the third compiled code file in the local repository; and
removing the third compiled code file from the first plurality of compiled code files to generate a third plurality of compiled code files for the second version of the application service; and
providing the second version of the application service by executing the third plurality of compiled code files;
in response to receiving a rollback command in the application server, performing the steps of:
copying the third compiled code file from the local repository to the third plurality of compiled code files to generate a fourth plurality of compiled code files that include the third compiled code file, and
providing, in the application server, a rolled-back first version of the application service by executing the forth plurality of compiled code files including the third compiled code file retrieved from the local repository.

2. The method of claim 1, wherein some but not all compiled code files necessary to provide the second version of the application service are received as part of receiving the replacement compiled code file.

3. The method of claim 1, wherein the local repository stores copies of some but not all of the first plurality of compiled code files associated with the application service.

4. The method of claim 3, wherein the compiled code files stored in the repository are sufficient to perform a rollback of the second version of the application service on the application server to the first version of the application service.

5. The method of claim 1, wherein the local repository stores copies of some but not all of the first plurality of compiled code files associated with the application service, and the compiled code files stored in the local repository are sufficient to perform a rollback of the second version of the application service on the application server to the first version of the application service.

6. A system comprising:
a communication network;
a control server communicatively connected to the communication network; and
a plurality of application servers, wherein each application server is communicatively connected to the communication network and is configured to provide a first version of an application service by executing a first plurality of compiled code files associated with the application service, the first plurality of compiled code files including a first compiled code file and a second compiled code file, wherein each application server is further configured to store the first plurality of compiled code files in a memory of the application server;
wherein the control server is configured to transmit, to each of the plurality of application servers, a replacement compiled code file corresponding to a second version of the application service for the first compiled code file; and
wherein each of the plurality of application servers is configured to:
receive, from the control server, the replacement compiled code file;
archive the first compiled code file in a local repository, local to and stored by the application server;
replace, in the memory of the application server, the first compiled code file of the first plurality of compiled code files with the received replacement compiled code file to generate a second plurality of compiled code files including the replacement compiled code file and the second compiled code file;
and
provide the second version of the application service by executing the second plurality of compiled code files;
receive, from the control server, identification of a third compiled code file included in the first plurality of compiled code files that is not needed to provide the second version of the application service;

in response to receiving the identification of the third compiled code file:
- archive the third compiled code file in the local repository;
- remove the third compiled code file from the first plurality of compiled code files to generate a third plurality of compiled code files for the second version of the application service; and
- provide the second version of the application service by executing the third plurality of compiled code files;

in response to receiving a rollback command in the application server:
- copy the third compiled code file from the local repository to the third plurality of compiled code files to generate a fourth plurality of compiled code files that includes the third compiled code file; and
- provide, in the application server, a rolled-back first version of the application service by executing the fourth plurality of compiled code files including the third compiled code file retrieved from the local repository.

7. The system of claim 6, wherein each of the plurality of application servers is further configured to receive some but not all compiled code files necessary to provide the second version of the application service as part of receiving the replacement compiled code file.

8. The system of claim 6, wherein the local repository stores copies of some but not all of the first plurality of compiled code files associated with the application service.

9. The system of claim 8, wherein the compiled code files stored in the repository of each application server are sufficient to perform a rollback of the second version of the application service on the application server to the first version of the application service.

10. The system of claim 6, wherein the local repository stores copies of some but not all of the first plurality of compiled code files associated with the application service, and the compiled code files stored in the local repository are sufficient to perform a rollback of the second version of the application service on the application server to a the first version of the application service.

* * * * *